Oct. 21, 1969  J. J. QUACKENBUSH ET AL  3,473,193
RECIPROCATING MULTI-ORIFICED INTERNAL DIE DIVERTER

Filed Jan. 3, 1967  2 Sheets-Sheet 1

JOHN J. QUACKENBUSH
HERBERT O. CORBETT
*INVENTOR.*

BY

United States Patent Office 3,473,193
Patented Oct. 21, 1969

3,473,193
RECIPROCATING MULTI-ORIFICED INTERNAL DIE DIVERTER
John J. Quackenbush, Monroe, and Herbert O. Corbett, Bridgeport, Conn., assignors to National Distillers and Chemical Corporation, New York, N.Y., a corporation of Virginia
Filed Jan. 3, 1967, Ser. No. 606,989
Int. Cl. B29d 7/08
U.S. Cl. 18—13                               1 Claim

ABSTRACT OF THE DISCLOSURE

A flat film extrusion die has a diverter section in its main channel which divides a stream of fluid plastic into two separate paths which recombine below the diverter. The diverter has an interior channel having spaced orifices discharging downwardly into the main recombining stream to inject individual streams of plastic material into the converging major paths. The plastic then flows with the individual streams sandwiched between the two main streams to a discharge orifice where the plastic is extruded in the form of a two-ply structure which encapsulates individual streams of material. The diverter is oscillated in a direction perpendicular to the plastic flow direction so that the individual plastic streams will undulate with respect to the film width. The plastic streams are of a plastic material different from that of the major body of the film and form a weaving pattern in the internal layer of the finished film or sheet and can be of a relatively high density material to add strength and tear resistance to major plies of low strength material. The internal threads can be of colored material to serve a decorative function.

---

This application is an improvement of application, Ser. No. 350,220, filed Mar. 9, 1964 in the name of Herbert O. Corbett and assigned to the assignee of the present invention.

This invention relates to plastic extrusion dies and more specifically relates to a plastic extrusion die having a multi-orificed internal diverter section which injects a plurality of streams of plastic material into the central region of a film which is to be extruded from the die. Internal diverters for plastic film extruders are described in the above-noted copending application, Ser. No. 350,220. In that application a fixed diverter is used to cause the main stream of a plastic fluid flow to separate into two paths which recombine below the diverter. A third stream is then injected between the two paths from a downwardly discharging channel in the diverter with these three streams flowing laminarly with respect to one another and being extruded from a common narrow, elongated extrusion orifice to form a multiple film of plastic material.

In accordance with the invention, the internal diverter is formed with a plurality of spaced channels and the diverter is oscillated perpendicular to the path of fluid flow in order to inject separate and undulating streams of plastic material which are encapsulated between the converging major paths of flow defined by the diverter. This can then form an arrangement wherein individual streams of high strength plastic is injected into the major body of a low strength sheet in order to provide increased sheet strength and tear resistance. Moreover, the individual streams may be of a colored plastic material to introduce an attractive appearance into the film. Finally, since the sheet will have an increased thickness where the streams are located and since the streams undulate, the sheet will have good roll geometry when it is wound into storage rolls.

Accordingly, a primary object of this invention is to provide a novel die structure for forming a reinforced plastic film.

Yet, another object of this invention is to form novel high strength undulating plastic threads in the interior of a plastic film or sheet.

Yet, another object of this invention is to introduce, during extrusion, a decorative and high strength undulating thread arrangement into a plastic sheet.

Yet, another object of this invention is to provide a novel diverter for plastic extrusion dies which is reciprocated perpendicular to the path of fluid flow and has a series of orifices of any desired geometric shape to create a multitude of streams at the die discharge orifice.

Yet, another object of this invention is to improve the roll geometry of plastic film which is to be wound into a roll.

These and other objects of the present invention will become apparent when reading the accompanying description and drawings, in which.

Figure 1:
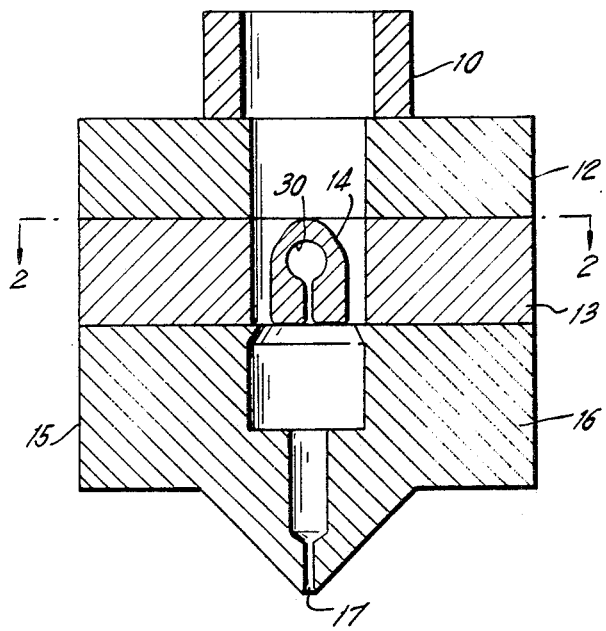
FIGURE 1 is a cross-sectional view of a die constructed in accordance with the present invention.

Referring now to the drawings, the die structure shown therein is substantially identical to the die illustrated in detail in above-noted application, Ser. No. 350,220 which is incorporated into the present specification by reference.

Figure 3:
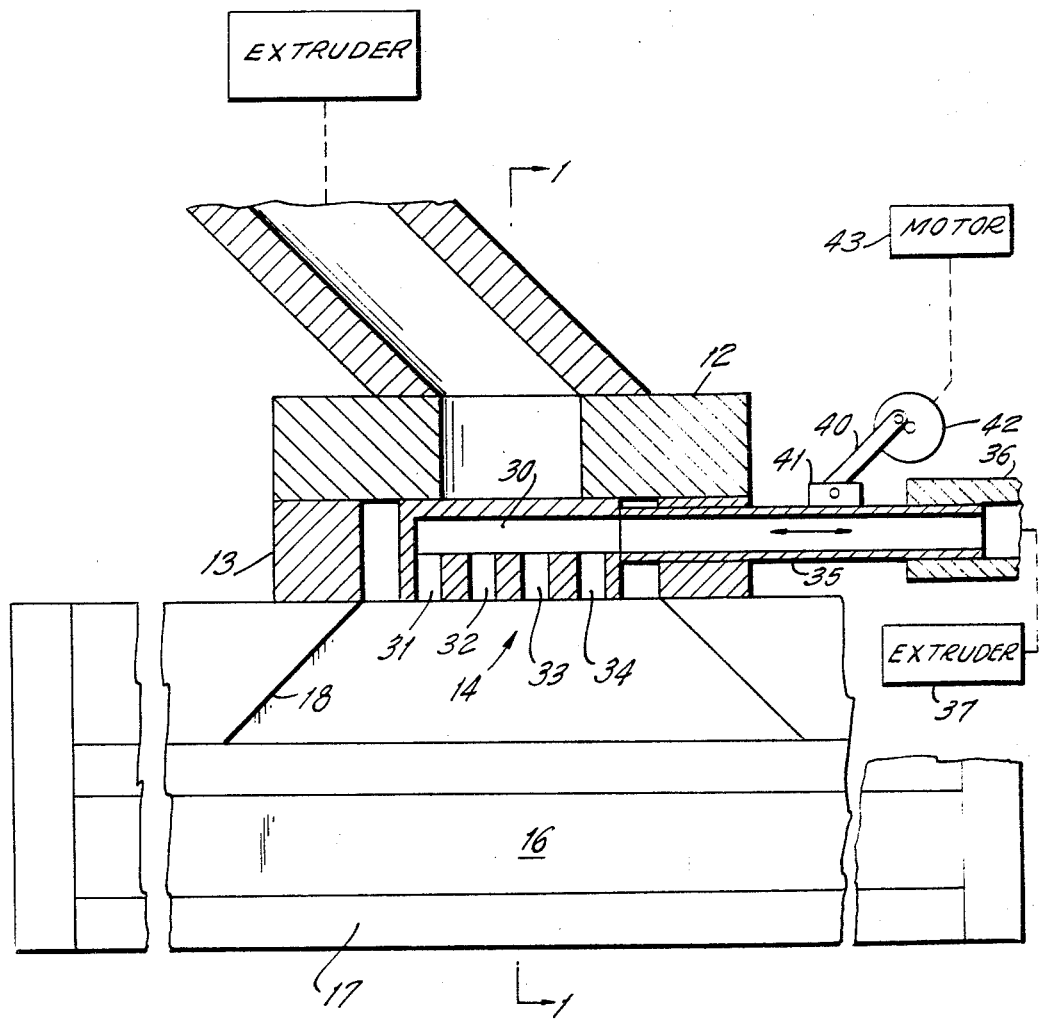
FIGURE 3 is a cross-sectional view of FIGURE 2 taken across the section line 3—3 in FIGURE 2.

More specifically, the basic die components comprise an inlet tube 10 which is suitably connected to an extruder schematically illustrated in FIGURE 3 as extruder 11. Tube 10 is connected to the top plate 12 of the die which, in turn, sits upon spacer plate 13 which provides room for the provision of diverter section 14 above the spaced discharge die halves 15 and 16. The discharge die halves 15 and 16 define an elongated discharge orifice 17 in the usual manner which is connected to the relatively short width central opening in plate 13 by the usual fan tail arrangement 18 formed in the interior of die section 15 and 16. Note that the diverter 14 has two opposing side notches or slots 20 and 21 therein which permit plastic flow from tube 10 to continue into the fan tail 18 along the sides of the diverter.

In the past, the diverter 14 has been stationarily positioned with a second extruder connected to a central channel in the diverter which injects a third plastic stream between the two plastic streams flowing through slots 20 and 21 so that a three-ply structure is extruded from orifice 17.

In accordance with the present invention, the die diverter is formed with a plurality of separate discharge orifices and is caused to reciprocate perpendicularly to the direction of plastic flow through the die. Thus, as shown in the figures, diverter 14 has an axially extending channel 30 which communicates with a plurality of downwardly extending channels 31, 32, 33 and 34 (FIGURE 3). The right-hand end of channel 30, which communicates with channels 31 to 34, is then secured to a tube 35 which passes through a suitable opening in ring 13 with a polished slide fit and terminates in a stationary body 36 again with a polished slide fit. A second extruder 37 is then connected to the end of the opening in body 36 in order to supply a fluid plastic material through the interior of reciprocable tube 35 to the channel 30 and, thus, to the individual channels 31 to 34. This material may be of any desired plastic, preferably of a diverse type of that obtained from extruder 11. For example, extruder 11 can supply a low density polyethylene and extruder 37 can supply a relatively high density polyethylene.

A suitable reciprocating mechanism is then connected to tube 35 to cause the tube to oscillate in the direction illustrated by the arrows in FIGURE 3. This mechanism includes a shaft 40, pivotally connected to ear 41 extending from tube 35 at its lower end. The upper end of crank 40 is then eccentrically connected, as illustrated, to the rotating disk 42 driven by some suitable drive motor 43. Clearly, as disk 42 is rotated, it will oscillate shaft 40 which is pivotally connected thereto to cause tube 35 to move with reciprocating motion.

The diverter 14 is then carried in a central chamber within member 13 which is sufficiently long to accommodate the full excursion of its motion. Moreover, the central opening in plate 12 will be small enough so that it will always be in communication with some portion of slots 20 and 21 of FIGURE 2 over the full excursion of diverter 14.

Figure 2:
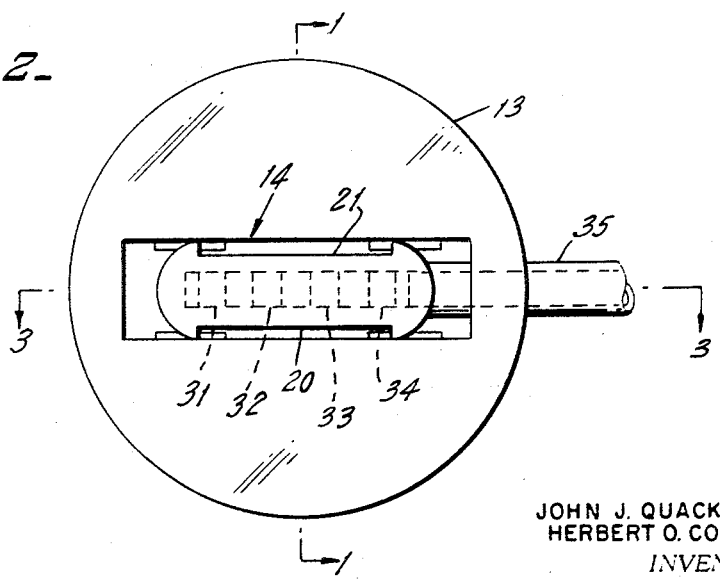
FIGURE 2 is a cross-sectional view of FIGURE 1 taken across the section line 2—2 in FIGURE 1.

In operation, the plastic material coming from extruder 11 will be diverted through slots 20 and 21 of FIGURE 2 by diverter 14 and will, thus, divide into two paths around the diverter. At the same time, material from extruder 37 will be extruded out of channels 31, 32, 33 and 34 between the two flow paths of the material from extruder 11. All of the streams will be joined below the diverter 14 with the streams from channels 31 and 34 forming plastic threads which are captured between the two major flow paths of plastic through channels 20 and 21 and will appear as individual threads embedded in the plastic stream.

As die diverter 14 is reciprocated, these streams will undulate across the width of the stream with the stream ultimately extruded through the discharge orifice 17, the film having the appearance of a film having threads of plastic material woven therein.

It is to be noted that the device can be operated with the diverter 14 held stationary so that the extruded film will be formed with a series of threads running in a straight line parallel to the machine direction. Where these lines or threads are formed of relatively high strength material with respect to the body of the film, it will be apparent that they could serve as extruded tear strips for packages wrapped in the plastic film.

Although there has been described a preferred embodiment of this novel invention, many variations and modifications will now be apparent to those skilled in the art. Therefore, this invention is to be limited not by the specific disclosure herein but only by the appending claim.

The embodiments of the invention in which an exclusive privilege or property is claimed are defined as follows:

1. An extrusion die for the extrusion of flat film comprising first and second spaced die halves defining a central elongated chamber leading to an elongated exterior discharge nozzle; a plate extending across the top of said die halves and having a horizontally elongated opening therein, the lower surface of said plate being connected to said die halves with said elongated opening in sealed communication with said elongated chamber; a first extruder means connected to said plate and having a passage in direct communication with the elongated opening therein; a fluid diverter positioned within said horizontally disposed elongated opening, said fluid diverter having first and second slots in the opposing longitudinal sides thereof to define first and second flow paths around said diverter providing communication from the passage in said first extruder means through the elongated opening in said plate to the elongated chamber in said die halves, the length of said diverter being less than the length of the horizontally elongated opening in said plate and the length of said first and second slots being greater than the width of the passage in said first extruder means; said diverter having a central chamber and a plurality of spaced openings providing communication from said central chamber to the elongated chamber in said die halves; a reciprocable tubular member having one extremity connected to said diverter in communication with the central chamber therein, the opposite extremity of said reciprocable tubular member extending through an aperture in said plate and projecting therebeyond; a second extruder means connected to said opposite extremity of said reciprocable tubular member whereby plastic material may be introduced directly into the chamber in said diverter; and reciprocating means associated with said reciprocable tubular member for oscillating said diverter within the elongated opening in said plate.

References Cited
UNITED STATES PATENTS 3,274,646  9/1966  Krystof.

WILLIAM J. STEPHENSON, Primary Examiner

U.S. Cl. X.R.

18—12